Feb. 16, 1971    R. PECK    3,564,602
METHOD OF PREPARING CLOSURES CONTAINING A FOAMED ANNULAR
SEALING LINER AND THIN CENTRAL PORTION
Filed Aug. 29, 1963
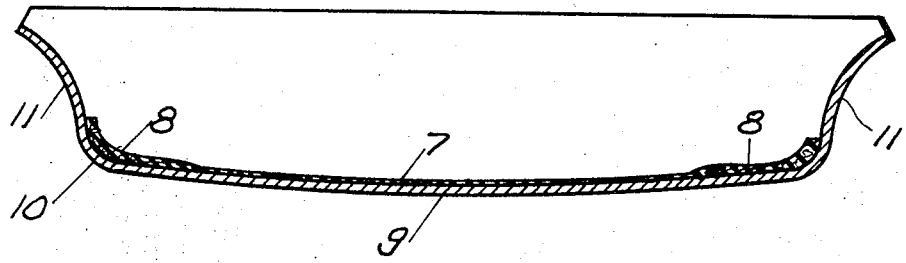
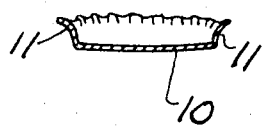
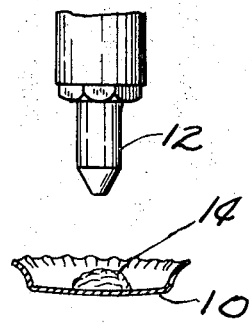
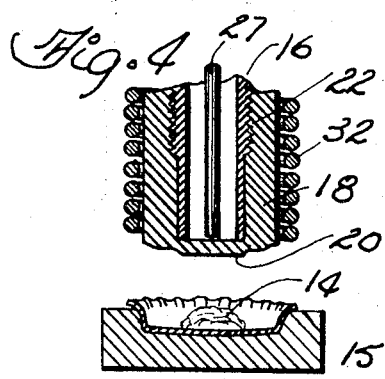
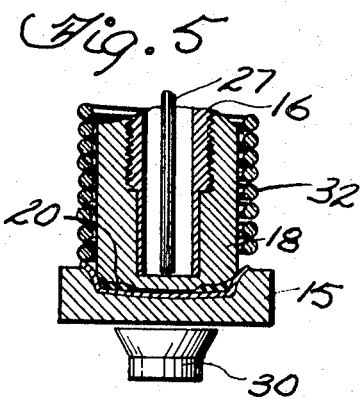
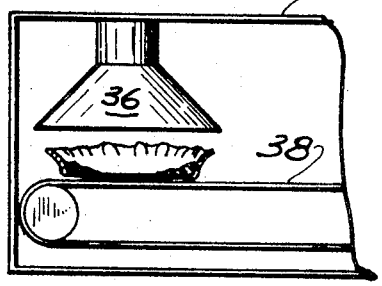
INVENTOR.
Robert Peck
BY
Pendleton, Neuman,
Seibold & Williams
att'ys the content of United States Patent Office document.

United States Patent Office 3,564,602
Patented Feb. 16, 1971

3,564,602
METHOD OF PREPARING CLOSURES CONTAINING A FOAMED ANNULAR SEALING LINER AND THIN CENTRAL PORTION
Robert Peck, Elmhurst, Ill., assignor to W. H. Hutchinson & Son, Inc., Chicago, Ill., a corporation of Delaware
Filed Aug. 29, 1963, Ser. No. 305,361
Int. Cl. B29d 9/06, 9/08, 27/04
U.S. Cl. 264—45                       7 Claims

ABSTRACT OF THE DISCLOSURE

A process for the production of "bottle caps" or crown closures with a liner having a very thin transparent central portion and a foamed annular ring. The foamable vinyl plastisol is deposited in the interior of the inverted closure. The deposited mass is then shaped by a plunger having a raised portion in its central portion. The shaped mass is then heated to gel the plastisol. Thereafter, the shaped plastisol is heated to a higher temperature to fuse and foam the plastisol.

---

This invention relates to the manufacture of closures for containers, and more particularly the liner employed in such closures to engage in sealing relation with the lip of a container.

In container closures, and particularly in the closures known as crown closures or "bottle caps," a liner is interposed between the closure and the lip of the container to be sealed, and is adapted to bear on the lip to seal the container. The liner may take the form of an annular ring adapted to bear on the lip of the container, or the form of a thin disk with an annular ring projecting from the periphery of one surface of the disk. The latter form lends itself more easily to automated manufacture and assembly, and such liners are commonly made by putting a quantity of moldable material into the cup of an inverted crown cap, and then pressing down with a punch or plunger to squeeze the material outwardly with respect to the plunger to form the projecting annular rim, the central portion of the disk being formed by the material which remains directly under the plunger.

It has been known in the prior art to form the disk type liners from synthetic resin materials, but a relatively great quantity of such material has been necessary to form a liner which is capable of making a good seal with the container.

The liner must have resilience in order to insure closure of the container, despite any surface irregularities which might exist at the lip of the container. But since the resilient qualities of the compositions used in the prior art are relatively poor, the annular ring must have a relatively great thickness to provide enough resilience to form a good seal with the container. This, of course, is an important factor in the cost of such closures.

It is therefore an important object of the present invention to manufacture a closure liner and which method of making the same effects a saving of material and therefore a reduction in the cost of such closures.

Another object of the present invention is to provide a closure having a liner with improved resiliency, without increasing the thickness of the liner.

A further object of the present invention is to provide an improved method of utilizing a composition from which closure liners may be formed.

These and other objects and advantages of my invention will become manifest upon an examination of this specification and the accompanying drawings and claims.

In one embodiment of the present invention there is provided a method of making an improved closure liner comprising combining a moldable material with an expandable material, inserting a quantity of the combined material into a closure, shaping the material within the closure to form a liner conforming to the contour of a container lip with which the closure is to be used, and causing said expendable material to expand and increase the thickness and resiliency of the liner.

Reference will now be made to the accompanying drawings, in which:

FIG. 1 is a diametric cross-sectional view of a closure commonly known as a crown cap, and illustrates the improved liner of the present invention; and FIGS. 2 to 6 are schematic illustrations of separate steps in the process of manufacture of the closure liner of the present invention.

Referring now to FIG. 1, the improved liner of the present invention comprises a disk having a relatively thin central portion 7 and a thicker peripheral portion in the form of an annular ring 8, the linear covering the substantially plane surface 9 of a closure 10, the annular ring 8 also engaging the side wall 11 of the closure. The shape of the liner is known in the prior art, but the liner of the present invention has improved mechanical characteristics, and is formed by a method which reduces the cost of the liner as compared to prior art liners.

The process by which the liner of the present invention is formed is illustrated in FIGS. 2 through 6, and begins with the alignment of an ordinary crown cap 10 with its side wall 11 opening upward as illustrated in FIG. 2. Preferably a number of such caps are fed in seriatim along a conveyor (not shown) or other apparatus for presenting successive caps to successive processing stations at which steps of the process to be described are performed. Such conveying means are well known to those skilled in the art and will therefore not be described in detail. The filling position is illustrated in FIG. 3 in which a dispenser 12 is operative to dispense a quantity of liner material 14 into the central portion of the closure 10. At the next step (FIG. 4), the closure is supported by a support ring 15, and a heated tubular press or plunger 16 is lowered toward the open end of the closure 10, and a die 18 supported by the plunger 16 is brought into engagement with the liner material 14, as shown in FIG. 5. The liner material is then squeezed outwardly with respect to the plunger 16 to form the annular ring 8, and to minimize the thickness of the central portion 7. Thereafter, the closure 10 with the formed liner material in place, is baked in an oven 34 (FIG. 6) to bring about decomposition of a blowing agent included in the liner material 14, and to cure the main constituents of the linear material 14. The decomposition of the blowing agent releases gas which is trapped by the liner material in a multiplicity of small pockets, bringing about an expansion of the liner.

The plunger 16 is provided with a forming tip or die 18 which has a contour on its lower surface 20 corresponding to the desired configuration of upper surface of the finished liner. The die 18 is threadably secured to the plunger 16 by threads 22, to permit interchange of dies, and to permit adjustment of the position of the die when in its lower condition.

The quantity of liner material 14 is a precisely metered amount for each closure 10, and the correct amount can easily be determined by trial and error and adjustment of quantity dispensed by the dispenser 12. When the correct quantity is reached, this may readily be recognized by examining the cap and its liner material after the depression of the plunger 16. When too much liner material is dispensed into the closure 10, the central portion 7 of the liner is unduly thick, while when too little liner material 14 is dispensed, the annular ring portion 8 of the finished liner is not fully and completely molded.

The tubular plunger 16 is heated by a heater element 27 disposed within the plunger 16, and the support ring is also heated by means of a gas burner or the like 30. By this means, the outer surface of the liner material 14 is cured so that the liner holds its shape after removal of the die 18.

As has been noted above, it is desirable to minimize the amount of liner material necessary to form a satisfactory seal. It is evident that the liner material present at the central portion of the liner is not necessary to the successful use of the completed closure, since the container is open at this portion, and therefore the central portion of the liner performs no sealing function. Accordingly, it is desirable to squeeze this portion of the liner material 14 as thin as possible, and force substantially all of the liner material into the periphery of the interior of the closure where it forms the annular ring 8, while leaving a thin film in the central portion.

In order to attain consistent results with respect to the physical dimensions of the liner after it is formed, the plunger 16 is preferably forced downwardly with precisely the same force during each operation. This is readily accomplished by the provision of a spring 32 disposed exteriorly of the tubular plunger 16, and bearing on a step 33 of the die 18. The downward movement of the plunger 16 is due entirely to the force of the spring 32 acting between the plunger 16 and some fixed reference point (not shown) on the frame of the machine holding the plunger 16.

In some cases, it may be desirable, however, to provide a greater thickness of material 14 in the central section of the liner, for reasons of appearance or the like, and this may be accomplished by varying the force applied to the plunger 16 by varying the compression on the spring 32, or by adjusting the position of the die 18 with respect to the plunger 16 by rotating one relative to the other, to provide a slightly greater distance between the bottom surface of the plunger and the upper surface of the interior of the liner 7. Especially in this case it is desirable for the bottom surface of the plunger 16 to refrain from picking up any of the liner material 14 after the same has been pressed into position, and this is accomplished by forming the die of a hard material which may be polished to a mirror finish.

In accordance with the present invention, the liner material 14 has incorporated therewith a blowing agent, by which the size and resiliency of the liner may be increased during the heating and curing step illustrated in FIG. 6. It is therefore evident that much less liner material, with the blowing agent, is needed to produce the same thickness of the finished liner as compared to liner material without the blowing agent. This brings about a considerable saving in cost of the liner. The blowing agent is decomposed by the heat applied by the oven 34 via an infra-red burner or the like 36, and undergoes a chemical reaction which substantially increases the volume of the blowing agent by releasing a considerable amount of gas, in relation to its volume before heating, thereby filling the liner material 14 with voids or gas pockets, and the completed liner thereupon takes on a spongy character, which is partly due to the compressibility of the gas. Accordingly, the resiliency of the liner 14, in addition to its volume, is increased by use of the blowing agent.

In accordance with the present invention, the liner material 14 is a composition formed as the fused product of a mixture of solvate of synthetic resin material with a plasticizer, a stabilizer, and a blowing agent. Examples of such compositions will now be given, in each of which examples the preferred range of amounts of each constituent is given, and also the prefererd amount within each range.

EXAMPLE I

| | Parts |
|---|---|
| Vinyl chloride resin powder | 100 |
| Plasticizer (di-2-ethyl hexyl phthalate) | 60 (40–80) |
| Stabilizers (epoxidized oil) | 5 (3–10) |
| (Calcium stearate; zinc stearate) | 3 (1–8) |
| Blowing agent (azodicarbonamide) | 0.2 (0.2–2.0) |

The above composition, after curing in the oven 34 illustrated in FIG. 6, forms a liner which is substantially transparent at the center portion thereof, due partly to the relatively good light transmission characteristics of the composition, and the relatively thin nature of the center section of the liner. In a crown cap, the center portion 7 of the liner is approximately ⅝″ in diameter and has an average thickness of between 0.002″ and 0.008″. Therefore, the composition of Example I can advantageously be employed to produce a transparent window or the like through which pictures or advertising material, etc., are visible on the interior surface of the closure 10.

EXAMPLE II

| | Parts |
|---|---|
| Vinyl chloride resin power | 100 |
| Plasticizer (di-2-ethyl hexyl phthalate) | 60 (40–80) |
| Stabilizers (epoxide oil) | 5 (3–10) |
| Stabilizers (calcium stearate, zinc stearate) | 3 (1–8) |
| Blowing agent (azodicarbonamide) | 0.2 (0.2–2.0) |
| Titanium dioxide | 2.4 (1–10) |
| Carbon black | 0.05 (0.05–5.0) |

The composition of Example II is similar to that of Example I, with the exception of the provision of a pigment comprising a mixture of titanium dioxide and carbon black. This gives the composition a gray appearance, which may be lightened or darkened by varying the proportion of the two pigment materials. This composition is substantially opaque, even in the relatively thin central portion 7 of the liner 14, and therefore may be used to hide imperfections in the interior surface of the closure 10, if any, and to provide a uniform appearance of the interior of the closure.

In both of the above examples the plasticizer forms a solvate with the resin which makes it sufficiently moldable to be ejected by the dispenser 12. The stabilizer is included for the purpose of preventing unwanted heat generated reactions in the solvate, and the blowing agent is provided for the purpose which has been already indicated. When the blowing agent is heated during curing of the finished cap, it increases the thickness of the annular rim by 25% to 60%, with a corresponding decrease in density. The exact amount of increase in thickness depends upon the concentration of the blowing agent within the composition, and the length of the heating and curing step in the oven 34. Instead of azodicarbonamide, the blowing agent may alternatively be N,N′-dimethyl-dinitrosoterephthalamide which also operates satisfactorily as a blowing agent.

The composition of the liner material may also include, if desired, wax, wetting agents, fillers, additional pigments, or internal dye release agents, each of which may readily be added by those skilled in the art to produce specific desired effects which are well understood.

In formulating the composition, the wax, wetting agents, fillers, pigments, etc., are dispersed into part of the plasticizer such as by melting or milling, or both. The choice of melting or milling depends somewhat upon the melting point of the fillers, etc., which are to be added. The total weight of the resin is blended with a sufficient amount of the plasticizer to produce a high viscosity dispersion, and then the pigment and filler dispersion is combined with the resin dispersion and the mixing continued until the batch is uniform. Then the remaining plasticizer, stabilizer and the blowing agent are added, and mixing is continued until all of the ingredients are uniformly dispersed. During all of the above mixing steps, the temperature is maintained below a temperature of 110° F. to prevent fusion of the resin and the plasticizer, and on the completion of the mixing, the batch is deaerated in the usual manner to remove entrained air from the mixture.

The dispenser 12, as has been pointed out above, dispenses a predetermined amount of the liner composition during the step in the process illustrated in FIG. 3. With respect to crown caps of the type illustrated, the preferred amount of composition to be deposited is between 200 and 400 milligrams. During the forming step illustrated in FIGS. 4 and 5, the temperature of the plunger 16 and the support ring 15 are held at between 260° F. and 340° F., by the heating element 27 and the burner 30, and about forty pounds of pressure is applied to the plunger 16 by the spring 32 for three to six seconds. The preferred temperature is about 300° F. and ordinarily four seconds is sufficient to complete the molding step.

In the oven 34 illustrated in FIG. 6, the closures are exposed for about ½ minute to one minute to a temperature between 375° F. to 450° F. with an exposure of about one minute and a temperature range of 400° F. to 425° F. being preferred to fuse the plastisol and decompose the blowing agent to bring about the above described increase in thickness and resiliency of the liner. As those skilled in the art will appreciate, the times and temperatures required within the fluxing oven 34 are interdependent, a higher temperature performing the desired step with less time and vice versa. After the completion of the curing in the oven 34, the closure 10 is carried away by means of a conveyor belt 38, which is preferably long enough to permit the closures to cool sufficiently to be readily handled when they reach the end of the conveyor 38.

Although the present invention has been specifically described for use with crown caps, the present invention may be used to form liners on a variety of closures, and achieves the same advantages when used in the production of other types of closures as on crown caps.

The foregoing will so fully and completely describe the present invention as to permit others skilled in the art, by applying current knowledge, to adapt the same for use under varying conditions of service without departing from the essential items of novelty involved, which are intended to be defined and secured by the appending claims.

What is claimed is:
1. A method of preparing closures containing a protective and sealing liner material characterized by a transparent central portion which method comprises:
   depositing a measured quantity of a vinyl resin plastisol containing a blowing amount of a chemical blowing agent in the interior of an inverted closure;
   forming and gelling the plastisol within the closure under heat and by application of pressure at a temperature insufficient to substantially decompose the chemical blowing agent thereby producing a relatively thin web central portion having a web thickness of about 2 to 5 mils in thickness and a relatively thick outer ring portion;
   heating the formed plastisol in the closure to a temperature sufficient to decompose the chemical blowing agent and to fuse the plastisol thereby providing a transparent fused central web portion and a cellular opaque ring portion of the vinyl plastisol.
2. The method of claim 1 wherein the vinyl plastisol is formed by a heated contoured punch inserted into the closure a controlled distance sufficient to produce a residual web thickness of about 2 to 5 mils.
3. The method of claim 1 wherein the vinyl plastisol is heated to a non-fluid gelled state prior to being formed into the desired shape.
4. The method of claim 1 wherein the plastisol is formed into a rounded shaped thickened O-ring portion.
5. A method of preparing closures including the steps of:
   depositing a measured quantity of vinyl halide plastisol containing a blowing amount of a chemical blowing agent into the interior of a closure;
   forming and gelling the plastisol within the closure by inserting a molding punch into the interior of the closure and applying sufficient heat thereto through the punch for a sufficient time to produce a non-fluid, shaped gel, said heat being insufficient to cause substantial decomposition of the chemical blowing agent and said punch forming said shaped gel into a relatively thin circular central web portion having a thickness of about 2 to about 5 mils and a relatively thick outer ring portion;
   retracting the heated punch; and
   heating the shaped, gelled plastisol in the closure to a temperature of about 375° to 425° F. for a time sufficient to decompose the chemical blowing agent and to form an expanded, opaque, cellular, fused ring portion and a thin transparent circular fused web portion.
6. The method of claim 5 which includes additionally providing a metal closure having an interior containing a predetermined visually observable design in the center thereof, the plastisol being of a kind which is substantially transparent in the non-cellular fused state, whereby upon formation of the thin web portion, the design will be observable.
7. A method of preparing closures containing a protective and sealing liner material which comprises:
   depositing a measured quantity of a vinyl resin plastisol containing a blowing amount of a chemical blowing agent in the interior of an inverted closure;
   forming and gelling the plastisol within the closure under heat and by application of pressure at a temperature insufficient to substantially decompose the chemical blowing agent thereby producing a relatively thin web central portion and a relatively thick outer ring portion;
   heating the formed plastisol in the closure to a temperature sufficient to decompose the chemical blowing agent and to fuse the plastisol thereby providing a fused central web portion and a cellular ring portion of the vinyl plastisol.

References Cited
UNITED STATES PATENTS
3,325,035  6/1967  Strickman _____ 215—40
3,344,093  9/1967  Strickman _____ 215—40X PHILIP E. ANDERSON, Primary Examiner U.S. Cl. X.R.

18—4, 5, 17; 161—6, 160; 215—40; 264—54, 268, 303